(12) United States Patent
Mance et al.

(10) Patent No.: US 7,405,738 B2
(45) Date of Patent: Jul. 29, 2008

(54) SYSTEM AND METHOD FOR GENERATING AND PROCESSING A STREAM OF VIDEO DATA HAVING MULTIPLE DATA STREAMS

(75) Inventors: Daniel Mance, Waterloo (CA); Chad Faragher, Kitchener (CA)

(73) Assignee: Harris Canada Systems, Inc., Toronto (CA)

( * ) Notice: Subject to any disclaimer, the term of this patent is extended or adjusted under 35 U.S.C. 154(b) by 970 days.

(21) Appl. No.: 10/274,928

(22) Filed: Oct. 22, 2002

(65) Prior Publication Data

US 2004/0075745 A1 Apr. 22, 2004

(51) Int. Cl.
*G09G 5/00* (2006.01)
*G06F 15/00* (2006.01)
(52) U.S. Cl. .................................. 345/629; 345/501
(58) Field of Classification Search ................. 345/506, 345/502, 629, 501
See application file for complete search history.

(56) References Cited

U.S. PATENT DOCUMENTS

| | | | | |
|---|---|---|---|---|
| 5,191,645 A | * | 3/1993 | Carlucci et al. | 715/723 |
| 5,275,327 A | * | 1/1994 | Watkins et al. | 228/102 |
| 5,621,428 A | * | 4/1997 | King et al. | 345/641 |
| 6,573,905 B1 | * | 6/2003 | MacInnis et al. | 345/629 |
| 6,919,892 B1 | * | 7/2005 | Cheiky et al. | 345/473 |
| 7,027,054 B1 | * | 4/2006 | Cheiky et al. | 345/473 |

OTHER PUBLICATIONS

Heirich, A. et al., "Performance scaling and depth/alpha acquisition in DVI graphics clusters", Hewlett-Packard Corporation, Oct. 2002, United States.

* cited by examiner

*Primary Examiner*—Ryan Yang
(74) *Attorney, Agent, or Firm*—Dimock Stratton Ltd.

(57) ABSTRACT

The invention provides a system and method for processing a video stream having at least one video signal contained therein. The invention utilizes a computer, a video card connected to the computer and a frame processing card connected to the computer. The video card generates a digital video signal by inserting the video signal into the digital video signal. The digital video signal is transmitted from the video card to the frame processing card through a video output port of the video card. A video synchronization signal relating to the digital video signal is provided to the frame processing card. For the system and method, the frame processing card extracts the video signal from the digital video signal utilizing the video synchronization signal to maintain a frame rate for extracting the video signal.

8 Claims, 6 Drawing Sheets

Video Processing System 100

Video Processing System 100

SYSTEM AND METHOD FOR GENERATING AND PROCESSING A STREAM OF VIDEO DATA HAVING MULTIPLE DATA STREAMS

FIELD OF ART

The invention relates to a system and method for processing a digital video signal, in particular utilizing a standardized computer platform to produce multiple video images for further processing and transmission.

BACKGROUND OF INVENTION

In a video processing system, video signals originating from multiple sources (e.g. video cameras, DVDs, VCRs and computer generated images) may be processed and combined into a single aggregate signal, encoded in a particular format, such as NTSC, PAL or High Definition Video. Prior art systems process and combine the different video signals. The systems must provide for generation locking, or "genlock", to synchronise the video signals and stabilise the image when switching between the video sources or integrating with other equipment. Without a genlock signal for the video signals, an output video signal may lose its continuity when switching between two inputs and phase errors will occur when integrating with other video equipment. To provide a genlock for two video signals, one video signal is selected as a master and a synchronization signal for the other video signal is derived from the synchronization signal of the first signal.

The use of a personal computer (PC) as a video signal processor in professional video processing studios has greatly increased. Commercially available hardware and software products which are integrated into a PC provide a standardized platform for processing the video signals. PCs provide a standardized bus (a PCI interface), an accelerated graphics port (AGP) and a widely-used software platform using Intel-based programming languages.

The digitization of consumer video processing has been facilitated by I/O connections, device drivers and Microsoft software components. Three dimensional (3D) graphics quality and performance levels at consumer price points now rival dedicated graphics systems. Video manipulations in real-time using standard PCs are now of a quality level acceptable for professional television broadcasting. For example, Microsoft Windows Media components provide operating system level routines for MPEG compression and decompression, color space and format conversion of video signals. Recent upgraded versions of the Media components provide increased capabilities over earlier versions.

Several PC-based video processing components are available from companies (such as AJA Video Systems Inc., Leitch Technology Corp., Pinnacle Systems Inc., and Matrox Electronic Systems Ltd.) which provide some capabilities for mixing video signals. However, these components are heavily leveraging hardware-centric designs based on chip-level integration and handle video through dedicated on-board signal paths. Such designs are not fully integrated with three-dimensional hardware of PCs; also they have performance bottlenecks from utilising a single standardised PCI bus. Such designs are not fully scalable to increases in standard 3D capabilities and changes or improvements to WindowsMedia formats or methods. Although these systems provide genlocking of video signals, the genlocking process is set in hardware circuits and, as such, requires a high degree of chip-level integration of such signals with 3D and video processing hardware.

There is a need for a video processing system which can provide real-time processing and genlocking of video signals and 3D graphics in an easily maintainable and upgradeable platform, preferably on a PC-platform, which utilizes available, standardized hardware and software components for improved scalability.

SUMMARY OF INVENTION

In a first aspect, a method of processing a video stream having at least one video signal is provided. The method utilizes a video processing system including a computer, a video card connected to the computer and a frame processing card connected to the computer. The method comprises the steps of: generating a digital video signal by inserting at least one video signal the digital video signal utilizing the video card; transmitting the digital video signal from the video card to the frame processing card on a video output port; providing a video synchronization signal relating to the digital video signal to the frame processing card; and extracting the video signal from the digital video signal at the frame processing card utilizing the video synchronization signal to maintain a frame rate for extracting the video signal.

The method may have the digital video signal being encoded in a DVI format.

The method may generate the digital video signal by inserting the video signal at an insertion rate; and transmitting the digital video signal from the video card to the frame processing card at a transmission rate, with the transmission rate being greater than the insertion rate.

The method may delay inserting the video signal into the digital video signal when the frame processing card is not able to properly process the video signal.

The method may track the video signal in the digital video signal to determine when to delay inserting the video signal into the digital video signal.

The method may have the video signal being a field of a video signal and the digital video signal comprising a frame.

The method may have the frame comprising a tracking variable accessible by the frame processing card. Further, the tracking variable may be updated to identify when the video signal is inserted into the digital video stream. Also, any delay of insertion of the video signal into the digital video signal may be controlled, in part, by the tracking variable.

In a second aspect, a system for processing a video stream having at least one video signal is provided. The system comprises a computer, a video card connected to the computer and a frame processing card connected to the computer. The video card generates a digital video signal by inserting the video signal into the digital video signal. The digital video signal is transmitted from the video card to the frame processing card through a video output port of the video card. A video synchronization signal relating to the digital video signal is provided to the frame processing card. The frame processing card extracts the video signal from the digital video signal utilizing the video synchronization signal to maintain a frame rate for extracting at least one video signal.

For the system, the digital video signal may be encoded in a DVI format.

The system may have the video card generating the digital video signal by inserting the video signal at an insertion rate; further, the digital video signal may be transmitted from the video card to the frame processing card at a transmission rate, which is set a rate greater than the insertion rate.

The system may have cause the video card to delay inserting the video signal into the digital video signal when the frame processing card would not be able to properly process the video signal.

The system may track the video signal in the digital video signal to determine when to delay inserting the video signal into the digital video signal.

In a third aspect, a processing card is provided. The card is adapted to cooperate with a computer for processing a video stream. The video stream has at least one video signal encoded in a digital video signal received from a video card. The processing card is adapted to extract the video signal from the digital video signal utilizing a video synchronization signal related to the digital video signal to maintain a frame rate for extracting the video signal.

The processing card may utilize the digital video signal which is encoded in a DVI format.

The processing card may be adapted to signal to the video card to delay inserting the video signal into the digital video signal when the processing card cannot properly process the video signal.

The processing card may be adapted to update a counter which is used to determine when to delay inserting the video signal into the digital video signal.

In other aspects, the invention provides various combinations and subsets of the aspects described above.

BRIEF DESCRIPTION OF DRAWINGS

The foregoing and other aspects of the invention will become more apparent from the following description of specific embodiments thereof and the accompanying drawings which illustrate, by way of example only, the principles of the invention. In the drawings, where like elements feature like reference numerals which may bear unique alphabetical suffixes in order to identify specific instantiations of like elements).

DETAILED DESCRIPTION OF EMBODIMENTS

Figure 1:
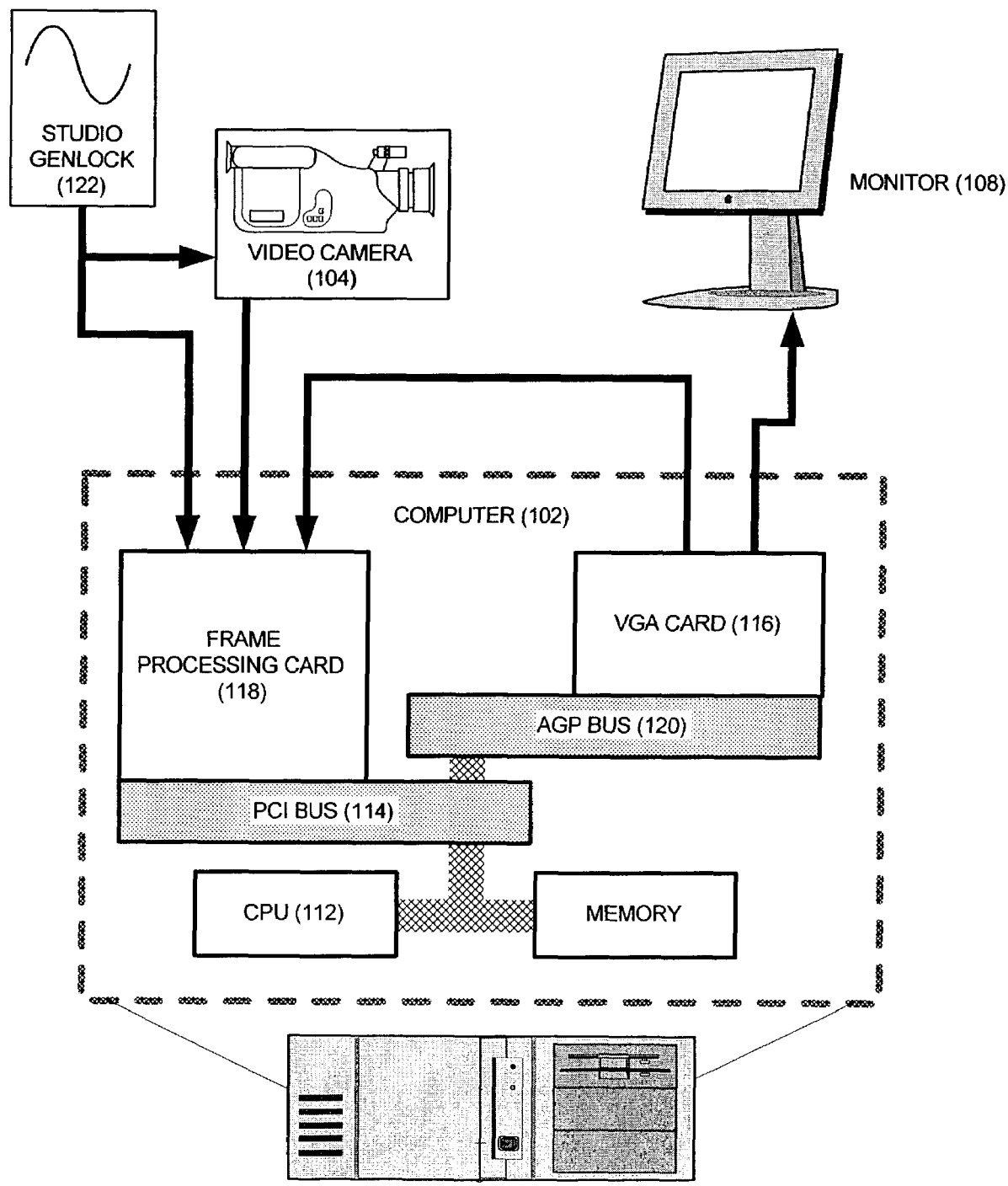
FIG. 1 is a block diagram of a video processing system embodying the invention, comprising personal computer (PC) with a video card and a frame processing card, and output display devices for the PC.

The description which follows, and the embodiments therein, are provided by way of illustrating an example, or examples, of particular embodiments of principles of the present invention. These examples are provided for the purpose of explanation, and not limitations, of those principles. In the description, which follows, like elements are marked throughout the specification and the drawings with the same respective reference numerals.

Referring to FIG. 1, aspects of video processing system 100 are shown. Components of video processing system 100 are computer 102 and display monitor 108. Within computer 102 is central processing unit (CPU) 112, PCI interface bus 114, AGP interface bus 120, VGA card 116 and frame processing card 118. In the preferred embodiment, computer 102 is a commonly used Intel-based platform which operates a version of Microsoft Windows, preferably Windows XP (trade-marks of Microsoft, Corporation). Accordingly, CPU 112 is preferably an Intel-based CPU or a functional equivalent, known in the art. For an Intel-based computer, such as computer 102, interface bus 114 comprises a Peripheral Component Interface (PCI) bus and VGA card 116 communicates with CPU 112 via an Accelerated Graphics Port (AGP) connection 120. The AGP connection 120 allows rendered data, 3D DirectX commands and digital video stream data to be efficiently transmitted between CPU 112 and VGA card 116. Digital video stream data includes digital data encoded in DVD, DV, MPEG1, MPEG2, WindowsMedia and other formats. Frame processing card 118 is connected to computer 102 via PCI bus 114. VGA card 116 is a display adapter for computer 102 and processes and manipulates visual media, 3D graphics and compressed video images which may be encoded in above noted formats. Video signal input from video camera 104 and studio genlock 122 are provided to frame processing card 118. VGA card 116 has two video output ports. One video output port is connected to monitor 108 to carry typical display signals for computer 102. The second output port is connected to frame processing card 118.

Figure 2:
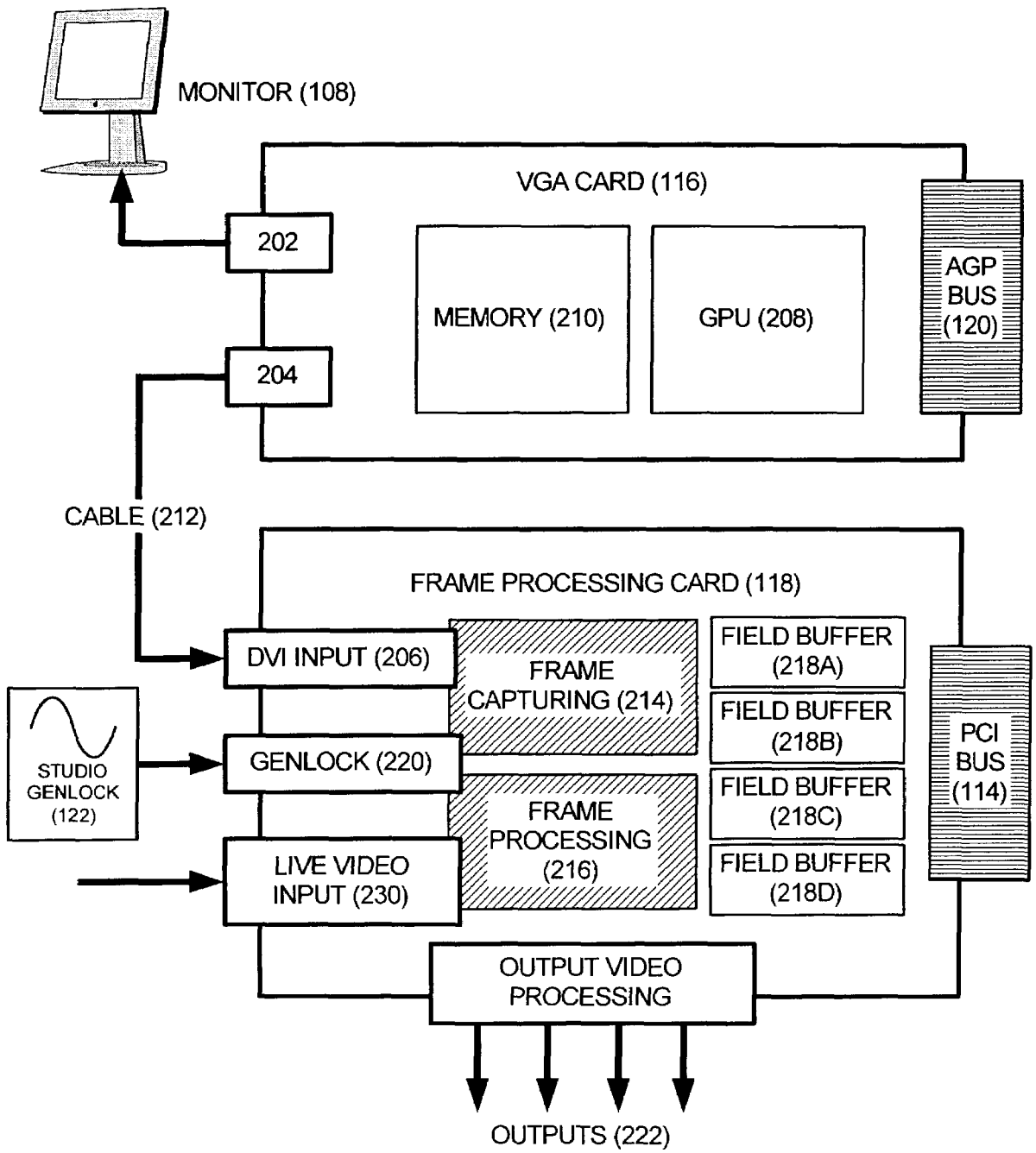
FIG. 2 is a block diagram of the video card, the frame processing card, an interface bus in the PC and a graphics port in the PC of FIG. 1.

Referring to FIG. 2, VGA card 116, frame processing card 118 and controlling software (described later) are, collectively, central elements 200 of video processing system 100. Central elements 200 combine to provide high-bandwidth processing of multiple video images in a readily available, standardized computer system. A main function of central elements 200 is to collect multiple individual video streams and generate a single aggregate stream therefrom. The individual video streams in the aggregate stream are preferably genlocked to a common control rate. Central elements 200 also allow the extraction of each individual video streams from the aggregate stream for individual processing.

Central elements 200 have the following features. VGA card 116 is a commercially available 3D video/graphics card having an AGP connection and at least one DVI output port. Such cards are available from nVidia Corporation (including GeForce4 cards) and ATI Technologies Inc. (model Radeon 7500 cards) (all trademarks are properties of their respective, noted owners). An AGP connection provides an access route for VGA card 116 to the memory in computer 102, while avoiding bandwidth bottlenecks associated with PCI bus 114. Frame processing card 118 is installed into PCI bus 114. Computer 102 is operating a Windows Operating System available from Microsoft Corporation. As part of the operating system, DirectX is an application program interface (API) used by the video processing system 100 to manage video and graphic images. Preferably, DirectX version 8 or higher is used.

On VGA card 116, a first output 202 is connected to monitor 108 and thereby is used to provide the primary control video information to display the typical windows generated by the computer and the software operating thereon. A second output 204 is preferably a Digital Visual Interface (DVI) output. The second output 204 is used as a dedicated digital data pipe instead of a traditional video output to a monitor, although VGA card 116 treats it as being a monitor. The DVI output port on VGA card 116 is used to carry the individual video streams as the aggregate video stream in a standard VGA stream. The aggregate stream is provided to the DVI input port 206 of video frame processing card 118. The aggregate stream is received by frame processing card 118 and the individual video fields are then extracted from the stream. At such time, each individual video field may be separately and additionally processed with live camera video prior to being transmitted at an appropriate frame rate. The transmission rate carried on the DVI channel must have sufficient bandwidth to enable the encoded fields to be processed at the necessary rates. In the embodiment, for four individual video streams, the aggregate stream is formatted to be a screen size of 1600×1200 pixels, with the resolution set for a bit-depth of 32 bpp (bits per pixel) and the refresh rate of 60 Hz.

It will be appreciated that the typical use of a DVI channel in VGA card 116 is to provide a (digital) video signal which can be displayed on an appropriate digital display device, such as a digital LCD display device. Accordingly, in a GUI Windows environment, a digital video signal is typically formatted to comply with Windows display output parameters. Such parameters include having the screen image represented in the digital video signal being comprised of one or more "window" panels. It will be appreciated that the screen image is meant to interact with cursor controls from an input device, such as a mouse. As such, in a typical implementation, when a cursor is placed over a window generated in the screen display (for example, by moving the mouse to place the cursor over a window) and the cursor is activated (for example, by pressing a mouse key), the operating system reacts by changing the video image (for example, by changing the colours of the display for the window from non-active to active colours). It will be appreciated that it is preferable to suppress the effect of having the operating system interfere with the input devices on the video image. In this embodiment, the DirectX API which controls the VGA card second head (output port 204) display device will use the modes "DirectX Full Screen Mode" and "DirectX Multi-Monitor Mode" to ensure that when the controlling application is active, the output to the second head is isolated as much as possible from WindowsOS operations.

To suppress the effect of having the operating system interfere with the input devices on the video image, the following steps are performed. As noted above, video processing system 100 is configured such that output port 202 of VGA card 116 is connected to monitor 108 and output port 204 of VGA card 116 is connected to input 206 of frame processing card 118. The controlling software can determine the actual devices to which each of output port 202 and 204 is connected by reading a unique VESA monitor identification string (ID string) of monitor 108 and frame processing card 118. The video processing system provides frame processing card 118 with a unique monitor ID string, allowing it to appear to be a monitor to VGA card 116. It will be appreciated that in another configuration, the connections for outputs 202 and 204 may be interchanged and the controlling software is enabled to recognize that configuration.

After the controlling software determines the configuration of output ports 202 and 204, using DirectX 8.1 the controlling software creates devices for the displays connected to VGA card 116, i.e. monitor 108 ("Display #1") and frame processing card 118 ("Display#2"). For Display #2, controlling software creates Device #2 and sets the display mode on Device #2 to 1600×1200, 32-bit color, 60 Hz refresh rate, full-screen mode, with a presentation interval of 1. For the embodiment, the 32 bpp mode is used for internal rendering purposes, whereas the DVI data is transmitted at 24 bpp. For Display#1, controlling software creates Device #1 and configures it to be in user mode.

Next, Device #2 is reset following operating system guidelines for multi-monitor operation. Next, the controlling software hides the cursor for Display #2, using known DirectX programming techniques. As such, the controlling software has priority access and control of the display surface intended for Display #2. The embodiment can now use this display surface for processing multiple video signals, as further described herein.

The embodiment provides at least the following advantages in using a DVI channel to process the individual video streams. First, as a DVI channel uses a digital format (preferably DVI-D), digital data of each individual video signal is easily encoded into the channel. Conversely, if an analog video channel were used, then before digital data is carried on it, the analog channel would have to be converted to a digital signal, which may introduce performance and error issues during the D/A and A/D conversion. Second, use of a DVI channel avoids bottlenecks existing between VGA card 116 and frame processing card 118, which would be present if AGP bus 120 and PCI bus 114 were used as an interface for the digital data. Third, as the DVI channel in VGA card 116 is designed to be a standardized format, different embodiments of VGA card 116 may be used in video processing system 100, as improvements appear in processing technologies. As such, frame processing card 118 may be used on a variety of combinations of different computers 102 and VGA cards 116.

Each video stream, by definition, is a stream of frames of still video images, which, when shown sequentially at a regular rate produce the impression of a "moving" image. In the embodiment, the regular rate is the frame rate. By NTSC transmission protocols, each frame is divided into two fields. The first field contains the even lines (0, 2, 4, 6 etc.) of a frame and the second field contains the odd lines (1, 3, 5, 7 etc.) of a frame. To generate a frame, the first field is provided to the display device, and then the second field is provided to the display device. Accordingly, the two fields must be provided at twice the frame rate, in order to maintain the frame rate for one frame.

Referring to FIG. 2, initial processing of the individual video streams is performed by VGA card 116. Accordingly, VGA card 116 receives rendering commands from host to display digital video feeds (MPEG, DVD, WMV), 3D graphics animations, textual content and other video content (not shown). VGA card 116 has a graphics processing unit (GPU) 208 and local memory 210. Each frame from each digital video feed is stored in local memory 210. VGA card 116 produces the aggregate video stream which combines individual video field images from the individual video streams. Accordingly, the embodiment may utilize existing low-level screen processing functions provided in VGA card 116 to store, process and transmit the single video stream. In the embodiment, up to four video fields may be provided in the aggregate video stream.

Figure 3:
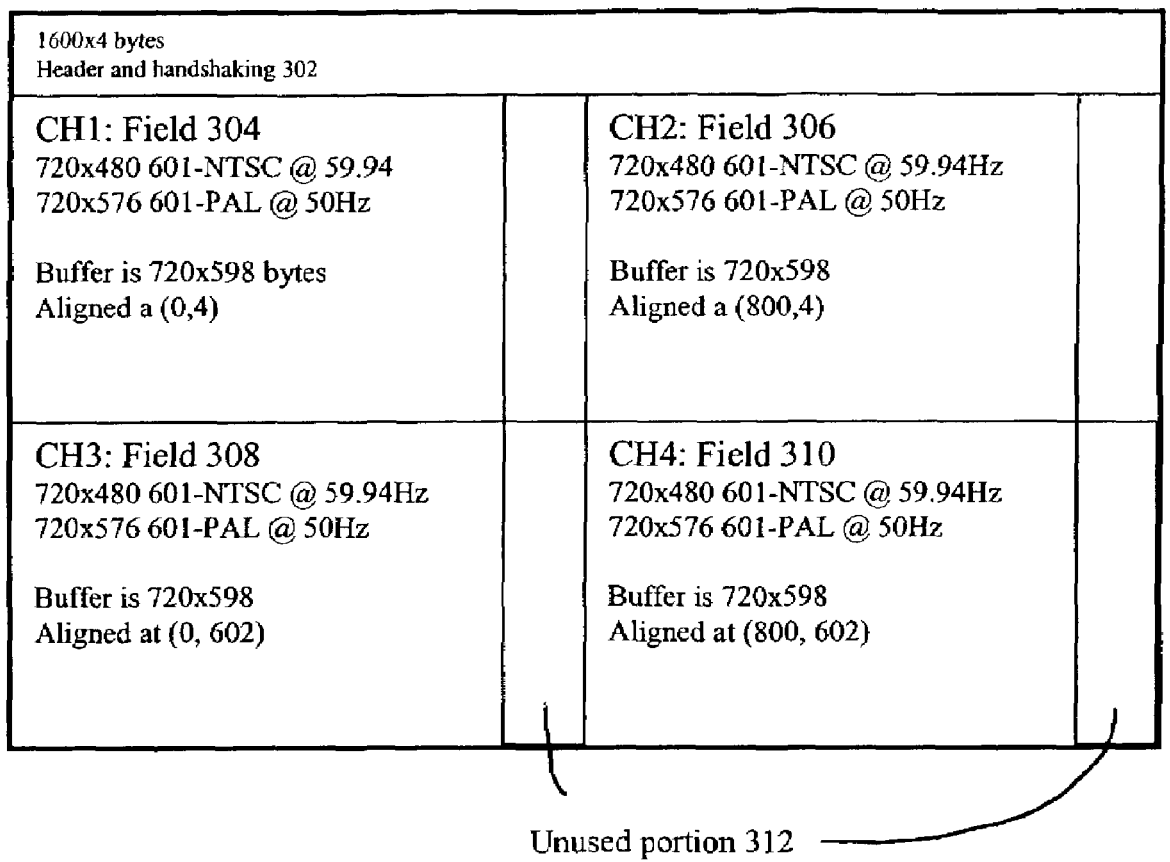
FIG. 3 is a schematic diagram of a memory map for video images generated and stored in memory in the frame processing card of FIG. 2.

Referring to FIG. 3, in preparing the aggregate video stream, fields of the individual video streams are stored in a defined layout in local memory 210 as memory layout 300. Memory layout 300 is a grid of bytes dimensioned as 1600 bytes long by 1200 bytes deep. Within the grid there are five regions. Header region 302 contains information relating to a field/frame tracking counter and administrative data relating to video stream; header region is dimensioned as 1600 bytes by 4 bytes. The field tracking counter is incremented each time data in the regions is updated with valid new data. The field tracking counter is used for synchronization of transmission of the frame to facilitate genlocking for fields in the frame. The remaining four regions provide data storage areas for the four video fields. The four regions are video storage fields 304, 306, 308 and 310. Each video storage field (304, 306, 308 and 310) has a dimension of 720×598 bytes. First video storage field 304 and second video storage field 306 are located adjacent to each other. Third video storage field 308 is located directly below first video field 304; and fourth video storage field 310 is located directly below second video region 306. Although in other embodiments, other sizes for video storage fields may be defined, preferably, each video storage field is larger than actual resolutions required for NTSC signals (having a resolution of 720×480 pixels) and PAL signals (having a resolution of 720×576 pixels). Accordingly, when processing either NTSC or PAL signals, each video storage field has unused portions 312 which may be for other purposes, such as digital audio or other ancillary digital content. It will be appreciated that for storing four fields, memory layout 300 is a convenient and natural mapping of individual fields in a grid. However, other arrangements may be used in other embodiments. For example, in other arrangements, the fields may be dispersed in non-continuous blocks to each other in memory 210.

In operation, when VGA card 116 transmits a frame onto DVI output port 204 to frame processing card 118, contents of grid 300 are transmitted at a frame rate defined by VGA card 116, but controlled by the controlling software. However, in processing an exemplary NTSC signal, VGA card 116 renders and inserts data into the DVI output stream 204 at a rate of 59.94 fields per second for a frame rate of 29.97 frames per second. This is the video field insertion rate and is the same rate as the genlock rate and the rate at which final NTSC (in this example) video will be displayed. Frame processing card 118 also reads and processes the fields at the genlock rate. Accordingly, two fields must be transmitted in two frames in DVI output port 204 in order to provide a video frame for an image. However, video processing system 100 transmits the rendered data in DVI output stream from VGA card 116 to frame processing card 118 at 60 Hz. This is the video field transmission rate. As such, it will be appreciated that as the transmission rate of 60 Hz is faster than the insertion rate of 59.94 Hz. Eventually, the field being currently rendered by VGA card 116 will be a full field ahead of the field being currently transmitted. Accordingly, video processing system 100 utilizes the field tracking counter to track which field is currently being rendered and which field is currently being transmitted. When VGA card 116 is a full field ahead in its rendering, video processing system 100 resynchronizes the rendering process to the transmission process by causing VGA card 116 to stop rendering for a period of one rendering cycle.

Turning now to controlling software of central elements 200, controlling software is installed in RAM of computer 102 and operates as a separate program in the Windows operating system. As part of the initialization of central elements 200, the controlling software preferably initializes frame processing card 118 by loading FPGA codes into the frame processing card hardware, initializes the DirectX subsystem for rendering and exclusive use of the second output of video card 116. The controlling software also initialises a test application for the system, which is the overall initiator of the video processing system. The controlling software is triggered either by a user input (for example, by activating a "start" radio button) or by an automated trigger.

In producing the video stream, the controlling software also controls an image rendering process for each video stream. For each rendered image, the controlling software allocates sufficient buffer space to handle the resolution of the rendered image. Memory may be accessible from system RAM in computer 102, in local memory in VGA card 116 or both. As noted above, images are 32 bpp RGBA or 24 bpp RGB at the resolution of the video image.

In rendering a video stream, the controlling software selectively fills local memory 210 with data, which may represent a video clip played back from a digitized source, a still image or any dynamic graphical image. The data may be rendered into the memory 210 by one or a combination of the following methods:

A DMA access by CPU 112 to local memory 210 in VGA card 116, with data directly written via the DMA access into the local memory 210;

An external hardware system associated with computer 102 captures a video stream and deposits the stream in to local memory 210;

GPU 208 writes video data into local memory 210 of VGA card 116;

DVD video format data is provided from an external source, such as a DVD player; the video stream therefrom is decoded from the DVD format by either CPU 112, GPU 208 or both into either a PAL or NTSC format and is written to the local memory 210; and Compressed digital video data is decompressed and decoded by either CPU 112, GPU 208 or both into either a PAL or NTSC format data and is written to the local memory 210.

The content of the buffers may be further manipulated through by processes which, compose, spatially transform or alter the color of the images. Algorithms and routines for such processes are known in the art.

Referring to FIG. 2, turning now to operating aspects of frame processing card 118, once VGA card 116 provides the aggregate video stream to DVI output port 204, cable 212 carries the stream to input port 206 of frame processing card 118. Frame processing card 118 has two main functions: capturing the aggregate video stream transmitted from video card 116; and processing the captured video stream into its component fields for further processing and display to their associated display devices.

Abstractly, frame processing card 118 comprises the following modules: DVI input module 206, frame capturing module 214, processing module 216, memory 218, genlock module 220, video input module 230 and four outputs 222. Frame processing card 118 communicates with computer 108 via PCI bus 114.

Figure 4:
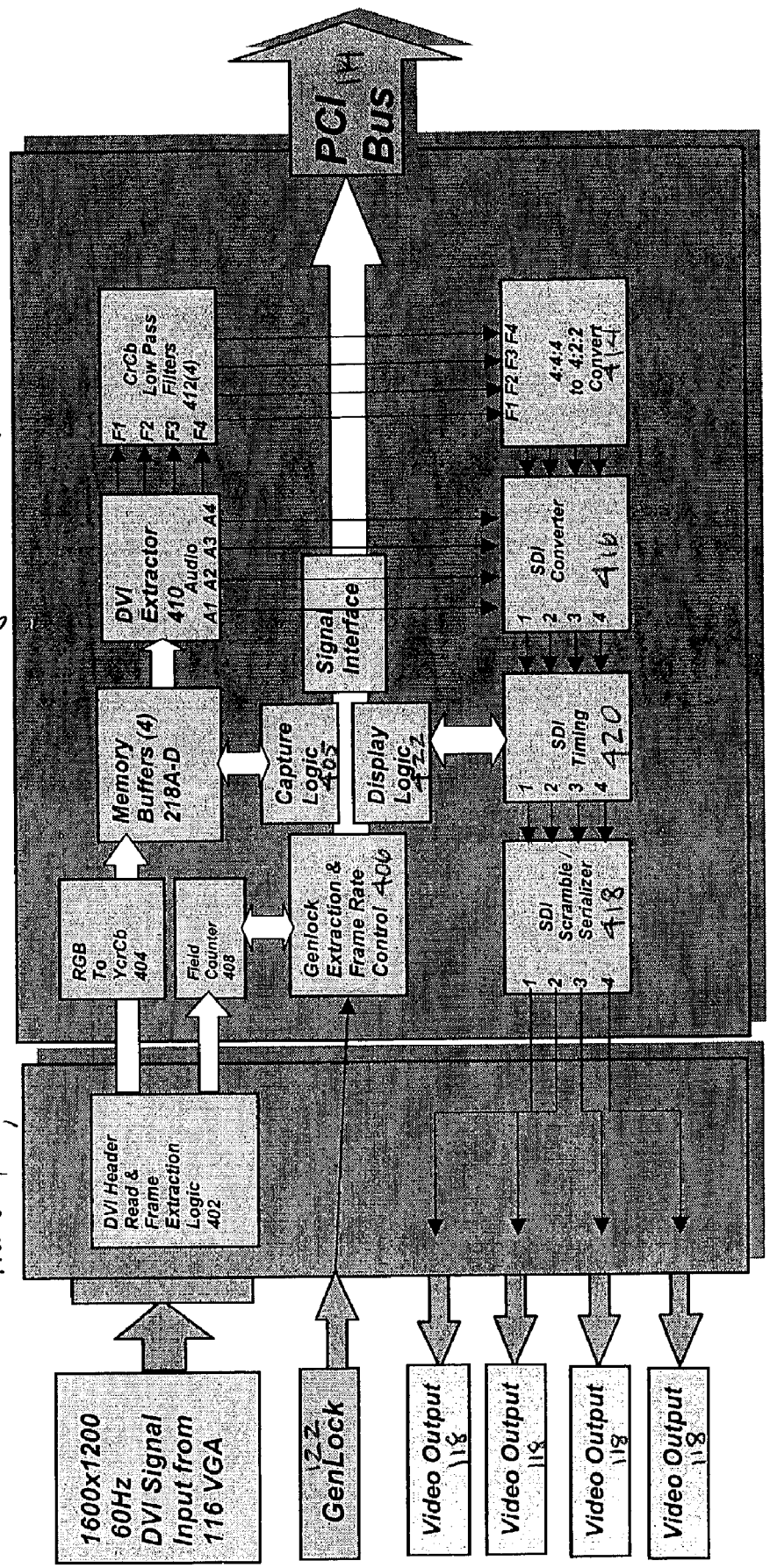
FIG. 4 is a block diagram showing further detail of the frame processing card of FIG. 2.

Referring to FIG. 4, further detail is provided on the modules of frame processing card 118. Once the data stream is physically received at DVI input 206, the data is forwarded to frame capturing module 214. Frame capturing module comprise DVI Header Read and Frame Extractor logic 402, which extracts frames from the data stream and reads the header and handshaking data in each frame. The extracted frames are provided to frame processing module 216. Frame processing module 216 processes each frame and extracts the fields contained therein at a rate controlled by the genlock rate, the transmission rate and the value of the counters contained in the frame headers. In frame processing module, the frames are sent to RGB to YCrCb module 404 to convert the frames, which are encoded in RGB video data format, into YCrCb colour space. The converted fields are stored in memory buffers 218A-D; storage of the fields in buffers 218 is controlled by capture logic 405. Synchronization of the extraction and rendering of fields in a frame is controlled by signals generated by the Genlock Extraction and Frame Rate Control Module 406 and Field Counter Module 408, which processes the values from the counters in the frame headers. Fields stored in buffers 218 are extracted by DVI extractor module 410 and then are further filtered by CrC Low Filters 412, as indicated by the arrows. Finally, data each filter field is converted to a serial format suitable for its associated display. Conversion is done by sequentially processing the converted data by the following modules: 4:4:4-4:2:2 conversion module 414, serial data (SD) converter modules 416 and SD scrambler/serializer module 418. Timing for the conversion is controlled by SD timing module 420 and display logic module 422. The resultant serial video data is provided to output ports on frame processing card 118. Signal interface module 424 provides a logic interface between frame processing card 118 and PCI bus 114.

For the capturing process, frame processing card 118 has memory 218 to store operational variables and received aggregate video stream. In the embodiment, memory 218 is large enough to store four fields of images for each frame. As noted earlier, a video image is a frame having two interlaced fields. Therefore in order to store all image data for a frame, memory 218 would, in a fully synchronized system, have to be able to store video data for each of the interlaced fields. Accordingly, an extra video field may need to be stored by frame processing card 118. Frame processing card 118 may ignore the DVI frame when VGA card 116 skips a frame.

As the aggregate video stream is actually formatted as a screen image, it may be displayed immediately by an appropriate display device for debugging purposes. Since frame processing card 118 is receiving DVI signal data much as a display monitor would, frame processing card 118 must provide signals in cable 212 to video card 116 to mimic a display device, when necessary.

When processing the captured video stream, frame processing card 118 reads individual fields stored in memory 218 and encodes each field into a suitable form for video rate transmission or further processing by other video devices, for example, signal modulation and mixing with live video on input port 230. The video rate transmission follows SMPTE video standards. In processing the fields in the video stream, a synchronization signal must be provided to "genlock" the fields. This synchronization signal is provided to the frame processing card 118 from a "studio sync" source equipment as is common practice in a video production environment.

Referring to FIG. 2, for frame processing card 118, synchronization is achieved by processing externally generated synchronization signal 122, which are provided to frame processing card 118 via genlock input port connected to genlock module 220. Synchronization signal 122 may be derived from a typical analog or digital video signal, using known techniques.

Genlock module 406 performs the extraction of the synchronization signal 122. Once the synchronization signal is extracted, genlock module 406 creates a genlock signal clocked at a frequency of 59.94 Hz for NTSC signals, 50 Hz for PAL signals and 60 Hz for high definition video signals. The genlock signal is provided to processing module 216 to synchronise and clock SMPTE video transmissions generated from the video stream. Also to guide the field pacing required so that the VGA card 116 skips fields at the right time.

Further detail is now provided on the cooperation and synchronization provided amongst central elements 200 of video processing system 100. An additional function of the controlling software is to synchronise genlock field tracking and facilitate alignment of the fields in the aggregate video stream. Accordingly, frame processing card 118 and controlling software communicate their operating status with each other. Controlling software also controls the rate of insertion of fields into the aggregate video stream. The transmission rate is selected to be at a higher rate than all of the possible genlock rates, in order to be able to maintain synchronization for any of the possible genlock rates. Note that the transmission rate is the DVI signal display rate (selected at 60 Hz in this embodiment). As the video processing system supports genlock rates of 59.94 Hz, 50 Hz and 60 Hz, controlling software uses a clocking signal of 60 Hz.

In particular, frame processing card 118 has low-level drivers which generate and send a signal from frame processing card 118 to the controlling software, signalling the controlling software when the video signal stream transmitted in the DVI signal will overrun the genlocked output video stream. The controlling software is then programmed to recognise the overrun condition and to react by skipping rendering of data for a programmed amount of time.

While the video stream is being rendered in VGA card 116, transmitted to frame processing card 118 and processed by frame processing card 118, controlling software and firmware operating on frame processing card 118 coordinate timing and execution of rendering of individual fields in the aggregate video stream and extraction and genlocking of fields from the stream on an field-by-field basis. As controlling software builds a full video stream for transmission, it utilizes the field tracking counter to track the identity of the currently rendered video field to synchronize image rendering. If a genlock overrun condition is imminent, the overrun condition is rectified by having controlling software skip a processing cycle for the current/next field. Also, within frame processing card 118, in order to minimize processing and memory access conflicts between capturing module 214 and the processing module 216, each process attempts to access different fields within the stream at the same time. This conflict management is facilitated by having the capturing process accessing one field in the video stream while having the processing module accessing the next field in the series of four frames in a stream.

Timing aspects of field rendering are illustrated in Chart A below which summarizes events in rows as time passes downward through Chart A. Briefly, VGA card 116 renders fields to frame processing card 118 and maintains genlock with external equipment. Chart A describes a normal flow of operation (when the processes have run long enough for all buffer to be filled with valid data, but not long enough for a buffer overrun to occur).

Chart A
Normal Rendering-Capture-Display Process

| Gen-lock Time | DVI Time | Event | VGA card 116 action | Frame processing card (FPC) 118 Capture process | Frame processing card (FPC) 118 Display process |
|---|---|---|---|---|---|
| | | | Render an <u>even</u> field of data into alternating lines of the off-screen DVI display buffer. Update field counter | Wait for receipt of DVI <u>even</u>-field | Wait for external genlock sync (alternate even-field/odd-field) |

Chart A
Normal Rendering-Capture-Display Process

| Gen-lock Time | DVI Time | Event | VGA card 116 action | Frame processing card (FPC) 118 Capture process | Frame processing card (FPC) 118 Display process |
|---|---|---|---|---|---|
| 1/59.94 s | | | | | Genlock received. Read DVI field buffer and format into a video signal. |
| | 1/60 s | DVI field is transferred | Display even-field to DVI port (off-screen-to-on-screen) Render a odd field of data into alternating lines of the off-screen DVI display buffer Update field counter Received notification from FPC 118 that even field has been processed; can now proceed to render new even field. | Read DVI even-field header Capture even DVI field into buffer Notify VGA card 116 Render that even-field capture complete; Wait for receipt for DVI odd-field | |
| 1/59.94 sec | | | | | Genlock received. Read DVI field buffer and format into a video signal. |
| | 1/60 sec | DVI field is transferred | Display odd-field to DVI port (off-screen-to-on-screen) Render a even field of data into alternating lines of the off-screen DVI display buffer. Update-field counter Received notification from FPC 118 that odd field has been processed; can now proceed to render new odd field. | Read DVI odd-field header Capture DVI odd-field into buffer Notify VGA card 116 Render that odd-field capture complete; Wait for receipt for DVI even-field | |
| | 1/60 s | DVI field is transferred | Display even-field to DVI port (off-screen-to-on-screen) | Read DVI even-field header | |

As the events proceed, rendering performed by VGA card 116 (which occurs at a 1/60th of a second rate) may eventually cause a buffer overrun to occur. Following Chart B provides a summary of the events and actions which occur thereat.

Chart B
Genlock Overrun Rendering-Capture-Display Process

| Genlock Time | DVI Time | Event | VGA Card 116 (VGA card) Render process | Frame processing card (FPC) 118 Capture process | Frame processing card (FPC) 118 Display process |
|---|---|---|---|---|---|
| | | | Render an even field of data into alternating lines of the off-screen DVI display buffer. Update-field counter | Wait for receipt of DVI even-field | Wait for external genlock sync (alternate even-field/odd-field) |
| | 1/60 sec | DVI field is transferred | Display even-field to DVI port (off-screen-to-on-screen) Render a odd field of data into alternating lines of the off-screen DVI display buffer | Read DVI even-field header Destination Capture buffer will overrun a previous capture - set 'Skip-A-Field' signal | |

-continued

Chart B
Genlock Overrun Rendering-Capture-Display Process

| Genlock Time | DVI Time | Event | VGA Card 116 (VGA card) Render process | Frame processing card (FPC) 118 Capture process | Frame processing card (FPC) 118 Display process |
|---|---|---|---|---|---|
| 1/59.94 sec | | | | | Genlock received Read DVI field buffer and format into a video signal (this frees up allocated buffer) |
| | 1/60 sec | DVI field is transferred with previous even-field content | Update field counter Received notification from FPC 118 that 'Skip-A-Field' has occurred DON'T Render next even field. DON'T Display off-screen DVI buffer (show previous even field DVI buffer) DON'T Render next odd field. | Notify VGA card 116 Render that; Skip-A-Field' has occurred Read DVI even-field header (again) Capture DVI even-field into buffer | |
| 1/59.94 sec | | | | | Genlock received. Read DVI field buffer and format into a video signal. |
| | 1/60 sec | DVI field is transferred | Received notification from VGA card 116 that even field has been processed; proceed to render new even field Display off-screen DVI buffer (contains previously rendered odd-field data) Render an even field of data into alternating lines of the off-screen DVI display buffer. | Notify VGA card 116 Render that even-field capture complete - Wait for receipt for DVI odd-field Read DVI odd-field header Capture DVI odd-field into buffer | Wait for external genlock sync (alternate even-field/odd-field) |

Each of the controlling software, the capturing process and post-capture process as independent FPGA threads, which are synchronised with each other using semaphores, implemented as variables. Captured DVI fields are deposited into memory buffers 218A, 218B, 218C and 218D in a cyclical fashion by the capture process 214. The same memory buffers are read by the frame display process 216 such that the read/write never conflict and such that data is never overwritten.

Turning now to the general operation of central elements 200 of video processing system 100, on start up of video processing system 100, both the controlling software and the capture process system must be initialised. In the initiation phase for the controlling software, counters are reset and the program waits to be advised of the genlock rate. In the initiation phase for the frame processing card 118, the genlock rate is determined, by genlock module 220. The rate information is provided to controlling software, field tracking variables are initialised and the capturing process and the display process are initiated.

For the controlling software, each field is processed individually, sequentially. After each field is processed, the field tracking variable is incremented. The field tracking variable is compared against the field tracking variable of the capturing process. If the captured field is not the immediately preceding field, then the capturing process is at least one field behind the field being rendered. Accordingly, the rendering program waits for a DVI rendering cycle, i.e. one 60 Hz period, to pass before rendering the next field. Also, for other synchronization failures, the capturing process may issue a "skip field" instruction to controlling software, in which the controlling software responsively waits for a 60 Hz period of the DVI signal to pass before continuing to render the next field.

Tables A, B, C and D provide summaries of initialization and execution processes of the controlling software and frame processing card 118.

TABLE A

Controlling software and frame processing card 118 Initialization

Controlling software initialization frame processing card (FPC) 118 determines the genlock field rate (59.94, 50, 60) Hz and communicates the field rate to the controlling software
Field Counter (FC) is reset to zero (0)
Start Rendering Process at the even (top = 0) field
FPC 118 initialization FPC 118 determines the genlock field rate (59.94, 50, 60) Hz and communicates the field rate to the controlling software
Buffers are allocated
The capture counter CINDEX is reset to zero (0)

TABLE A-continued

Controlling software and frame processing card 118 Initialization

The display counter DINDEX is set to three (3)
Field counter tags on buffers are reset to zero (0)
Start Capture Process
Start Display Process

TABLE B

Controlling software rendering process

Render a field of data at the defined genlock frame rate (59.94, 50, 60) Hz.
- Write field counter in header 302
- Increment field counter
Wait for notification (interrupt) from FPC 118 Capture process
Read signals and FC (captured field counter from FPC 118 capture process)
Signals are cleared by FPC 118 drivers when read by rendering process
Ensure that the FC (field counter) was the fresh field just rendered — else — let one
60Hz period pass before continuing with rendering.
If 'Skip A Field' signal was received during the rendering process then let one 60Hz
period pass before continuing with rendering.
If "Field Skipped" signal was received, FPC 118 is still trying to obtain genlock or has
processed an error condition.
Repeat, alternating fields

TABLE C

FPC 118 Capture Process

Wait for DVI frame start and read header and extract NewFieldCounter
If (CINDEX + 1) mod 4 == DINDEX then set signal "Skip a Field"
If NewFieldCounter != FC then
    Start capture new field into FIELDBUFFER[CINDEX]
    FC = NewFieldCounter
Else set signal "Field Skipped"
Notify DVI Rendering process that FC and/or signals have been updated
When capture of DVI field completes, CINDEX = (CINDEX + 1) mod 4
Repeat, alternating fields captured from the DVI stream

TABLE D

FPC 118 Display Process

Wait for even field genlock sync
If( DINDEX + 1) mod 4 != CINDEX then
    If FIELDBUFFER[(DINDEX + 1) mod 4] is an even field
        DINDEX = (DINDEX + 1) mod 4
    Else set signal "Field Duplicated"
Else set signal "Field Duplicated"
Display even field from FIELDBUFFER[DINDEX]
Wait for odd field genlock sync
If(DINDEX + 1) mod 3 != CINDEX then
    DINDEX = (DINDEX + 1) mod 3
Else set signal "Field Duplicated"
Display odd field from FIELDBUFFER[DINDEX]
Repeat As SMPTE video is interlaced, information within grid 300 is rendered in a field-oriented manner. Accordingly, to maintain rendering, the control software renders field 0, then field 1. Video processing system 100 can detect even/odd field detection and recovers from errors in genlock and host rendering using the genlock signal.

Turning now to output 222 of frame processing card 118, further detail on aspects thereof is provided. Generally, frame processing card 118 is preferably designed to handle ITU-R-BT.601 format video signals. As is known, the 601 signal format encodes signals in a 4:2:2 (R:G:B) signal, sampled at 13.5 MHz. The 601 signal format allows for NTSC and PAL signal generation. The gamma-corrected luminance signal is sampled at 13.5 MHz, while the gamma-corrected colour different signals, $C_R$ (R-Y) and $C_B$ (B-Y) signals, are each sampled at 6.75 MHz. Accordingly, when anti-aliasing filters are used, the analog bandwidth of the sampled luminance signal is 5.75 MHz, while the analog bandwidth of each sampled colour different signal is 2.75 MHz.

Also, video processing system 100 provides frame manipulation and processing for digital video data streams encoded in 24 bpp and 32 bpp formats. The buffer in video card 116 is partitioned to store images for four individual frames encoded in 24 bpp. Accordingly, when input video data is encoded in 24 bpp, the images stored in the buffer may be directly transmitted into the video stream using the 24 bpp DVI data format. However, for 32 bpp data stream, all the 32-bit information in a frame cannot be stored in one of the regions of the local memory 210 when the region has been defined to hold 24 bpp data. Accordingly, video processing system 100 converts the 32 bpp frames into a first frame of 24 bpp and a related second frame of 8 bpp. The 8 bpp data contains the alpha (transparency) value of the 24 bpp image. The extracted 8 bpp data is converted to 24 bpp content by duplicating the 8 bpp value across a RGB triplet associated with the 24 bpp frame.

In particular, video processing system 100 utilizes the following algorithm to record a 32 bpp (RGBA) image to a 24 bpp (RGB) surface. The algorithm processes the single image and generates two images, a first image containing the RGB channels of the original image and a second image containing Alpha channel information of the original image. The algorithm utilizes DirectX pixel shading functions provided in Windows XP, which enable the processing of digital image on a pixel-by-pixel basis. Table E summarizes the transforms executed using the pixel shaders.

TABLE E

DESTINATION ALPHA = (null)
The alpha channel is not used as the output image is follows RGB, not RGBA
IMAGE 1

DST R = SRC R
(Dest. R signal for the output -bit = Source R signal from the input -bit)
DST G = SRC G
DST B = SRC B TABLE E-continued

IMAGE 2

DST R = SRC A
DST G = SRC A
DST B = SRC A

Two pixel shaders are used. One shader writes the source RGB channels stripping out any source Alpha information so that DirectX does not pre-multiply the output. The second shader writes the source Alpha channel into the RGB channels of the second image. Table F provides the pixel shader function calls for the first and second pixel shaders.

TABLE F

First Pixel Shader code for RGB signal

Ps.1.1
Def c0, 1.0, 1.0, 1.0, 1.0
Tex t0
Mov r0.rgb, t0 + mov r0.a, c0.a
Second Pixel Shader code for Alpha Ps.1.1
Def c0, 1.0, 1.0, 1.0, 1.0
tex t0
Mov r0.rgb, t0.a + mov r0.a, c0.a In Table B, the (+) operator is compiled to have video card 116 perform both elements of the mov operation in parallel.

Some earlier versions of DirectX 8.1 Pixel Shaders, notably versions 1.0-1.3, do not allow per channel access to a color (with the exception of the alpha channel). Accordingly, when using these earlier versions, in order to write to RGB channel(s), it is necessary to write data to all three channels.

Figure 5:
FIG. 5 is representation of a test image processed by the video processing system of FIG. 1.
Figure 6:
FIG. 6 is a representation of contents of an output buffer produced by the video processing system of FIG. 1 after processing the test image of FIG. 5.

Referring to FIGS. 5 and 6, test image 500 was processed by video processing system 100. Test image 500 is a 24 bpp image having the contents of its RGB channels different from its Alpha channel. Results image 600 contains the Alpha channel information. Results image comprises first channel 602 and second channel 604. First channel 602 contains RGB data; second channel 604 contains alpha data. Results image 600 was produced with an offset provided to physically separate first channel 602 from second channel 604, making the alpha channel in second channel 604 appear beside the RGB channel in first channel 602.

The foregoing embodiment has been described with a certain degree of particularity for the purposes of description. Those skilled in the art will understand that numerous variations and modifications may be made to the embodiments disclosed herein without departing from the scope of the invention.

We claim:

1. A method of processing a video stream having at least one video signal utilizing a video processing system including a computer, a video card connected to said computer and a frame processing card connected to said computer, said method comprising: generating a digital video signal by inserting said at least one video signal at an insertion rate into said digital video signal utilizing said video card delaying said inserting said at least one video signal into said digital video signal when said frame processing card would not be able to properly process said at least one video signal, wherein said digital video signal comprises a tracking variable accessible by said fame processing card and said tracking variable is updated to identify when said at least one video signal is inserted into said digital video stream and said delaying said inserting of said at least one video signal into said digital video signal is controlled, in part, by said tracking variable; transmitting said digital video signal at a transmission rate from said video card to said frame processing card on a video output port, said transmission rate being greater than said insertion rate; providing an externally-generated video synchronization signal relating to said at least one video signal to said frame processing card; and extracting said at least one video signal from said digital video signal at said frame processing card utilizing said video synchronization signal to maintain a frame rate for extracting said at least one video signal.

2. A method of processing a video stream having at least one video signal utilizing a video processing system including a computer, a video card connected to said computer and a frame processing card connected to said computer, said method comprising: generating a digital video signal by inserting said at least one video signal at an insertion rate into said digital video signal utilizing said video card, wherein said digital video signal is encoded in a DVI format and comprises a frame and said at least one video signal is a field of a video signal; delaying said inserting said at least one video signal into said digital video signal when said frame processing card would not be able to properly process said at least one video signal; tracking said at least one video signal in said digital video signal to determining when said delaying said inserting said at least one video signal into said digital video signal occurs; wherein said frame comprises a tracking variable accessible by said frame processing card; said tracking variable is updated to identify when said at least one video signal is inserted into said digital video stream; said delaying said inserting of said at least one video signal into said digital video signal is controlled, in part, by said tracking variable; transmitting said digital video signal at a transmission rate from said video card to said frame proeessing card on a video output port, said transmission rate being greater than said insertion rate; providing an externally-generated video synchronization signal relating to said at least one video signal to said frame processing card; and extracting said at least one video signal from said digital video signal at said frame processing card utilizing said video synchronization signal to maintain a frame rate for extracting said at least one video signal.

3. A system For processing a video stream having at least one video signal, said system comprising: a computer; a video card connected to said computer; and a frame processing card connected to said computer, wherein said video card generates a digital video signal by inserting said at least one video signal at an insertion rate into said digital video signal, said video card is caused to delay said at least one video signal into said digital video signal when said frame processing card would not be able to properly process said at least one video signal, said processing card is adapted to update a counter used to determine when to delay inserting said at least one video signal into said digital video sianal, said digital video signal is transmitted from said video card at a transmission rate to said frame processing card through a video output port of said video card, said transmission rate being greater than said insertion rate, an externally-generated video synchronization signal relating to said at least one video signal is provided to said frame processing card and said frame processing card extracts said at least one video signal from said digital video signal utilizing said video synchronization signal to maintain a frame rate for extracting said at least one video signal.

4. A processing card for processing a video stream having at least one video signal encoded in a digital video signal received from a video card, said processing card adapted to extract said at least one video signal from said digital video signal utilizing an externally-generated video synchronization signal related to said at least one video signal to maintain a frame rate for extracting said at least one video signal, said processing card adapted to signal to said video card to delay inserting said at least one video signal into said digital video signal when said processing card cannot properly process said at least one video signal, and said processing card adapted to update a counter used to determine when to delay inserting said at least one video signal into said digital video signal.

5. A processing card for processing a video stream having at least one video signal encoded in a digital video signal received from a video card, said digital video signal encoded in a DVI format, said processing card adapted to extract said at least one video signal from said digital video signal utilizing an externally-generated video synchronization signal related to said at least one video signal to maintain a frame rate for extracting said at least one video signal, said processing card adapted to signal to said video card to delay inserting said at least one video signal into said digital video signal when said processing card cannot properly process said at least one video signal, and said processing card adapted to update a counter used to determine when to delay inserting said at least one video signal into said digital video signal.

6. The method of processing a video stream having at least one video signal as claimed in claim 1, said method further comprising: providing a notification to said video card that said delaying has occurred.

7. The system for processing a video stream as claimed in claim 3, wherein said frame processing card is adapted to signal to said video card when said delay occurs.

8. The processing card as claimed in claim 4, wherein said processing card is adapted to signal to said video card when said delay occurs.

* * * * *